March 20, 1945. E. W. MILLER 2,371,770
PLANETARY GEAR GENERATING MACHINE WITH INDEXING MEANS
Filed Feb. 12, 1942 4 Sheets-Sheet 1

March 20, 1945. E. W. MILLER 2,371,770
PLANETARY GEAR GENERATING MACHINE WITH INDEXING MEANS
Filed Feb. 12, 1942 4 Sheets-Sheet 2

Inventor
Edward W. Miller
by Wright, Brown, Quinby & May
Attys.

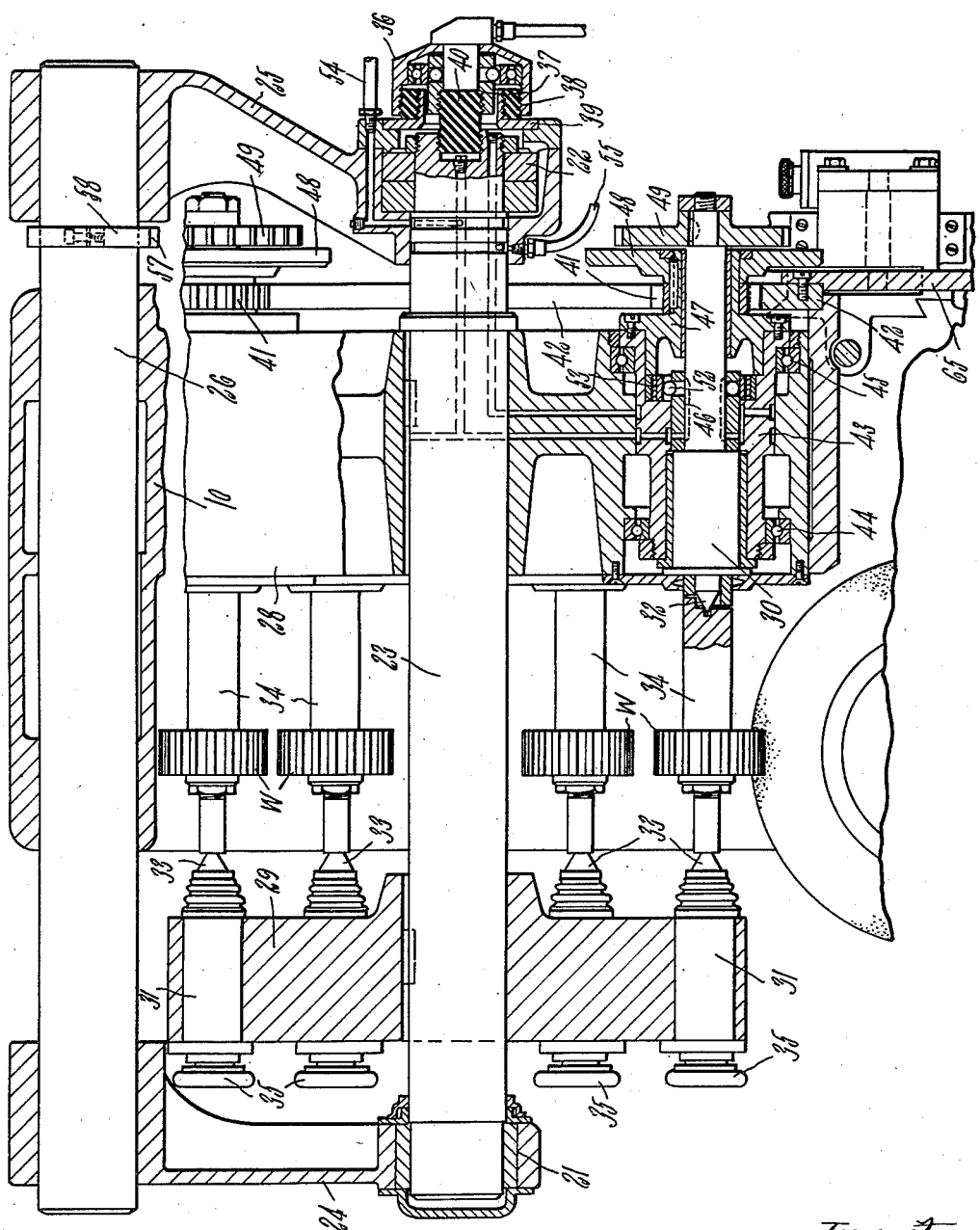

March 20, 1945.  E. W. MILLER  2,371,770
PLANETARY GEAR GENERATING MACHINE WITH INDEXING MEANS
Filed Feb. 12, 1942  4 Sheets-Sheet 4
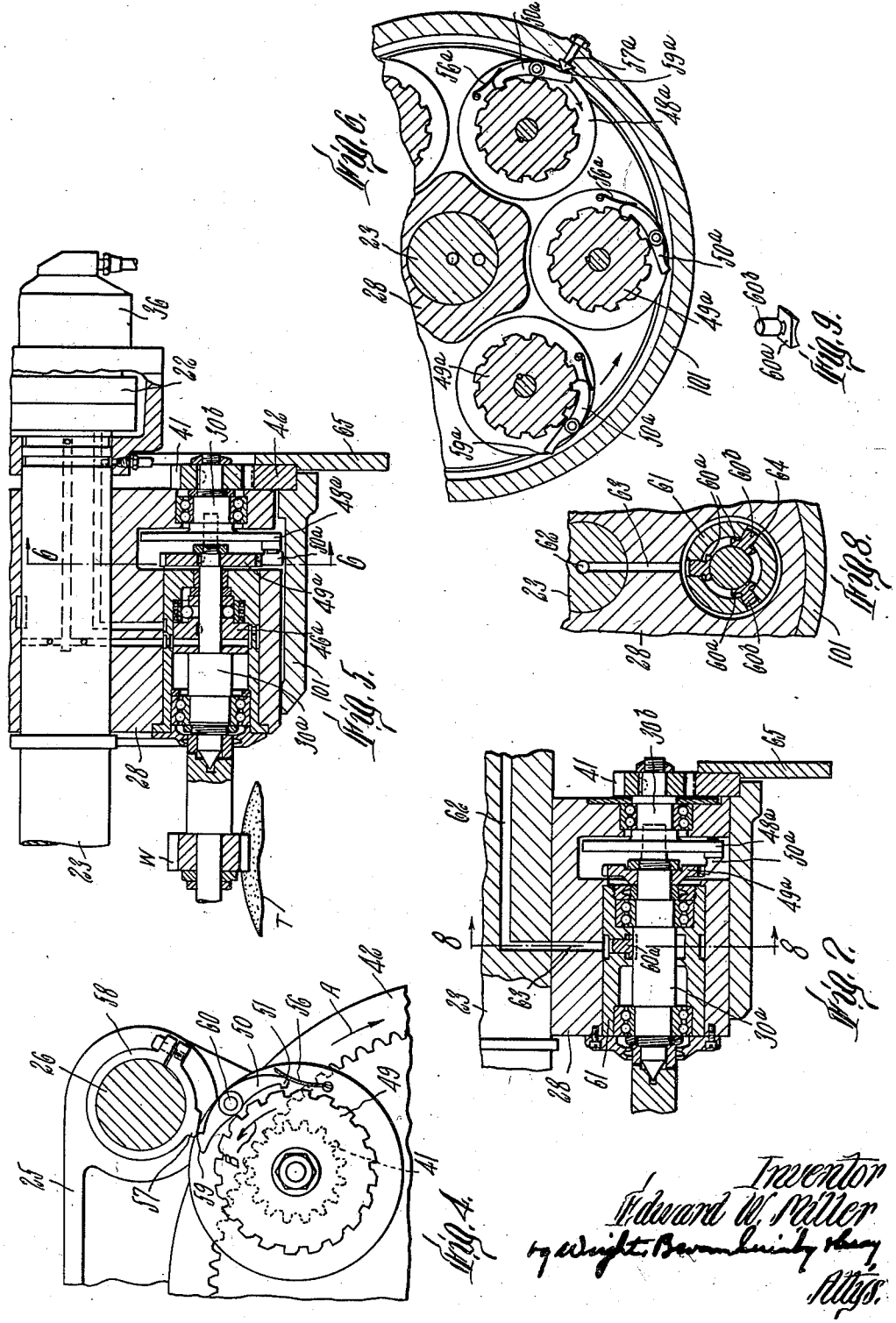
Inventor
Edward W. Miller
by Wright, Brown, Quinby & May
Attys.

Patented Mar. 20, 1945

2,371,770

UNITED STATES PATENT OFFICE 2,371,770

PLANETARY GEAR GENERATING MACHINE WITH INDEXING MEANS

Edward W. Miller, Springfield, Vt., assignor to The Fellows Gear Shaper Company, Springfield, Vt., a corporation of Vermont Application February 12, 1942, Serial No. 430,608

17 Claims. (Cl. 51—123)

The present invention is concerned with the generation of gear teeth by traverse of the gear or gears to be finished in a planetary path, with rolling motion, across the edge or rim of a cutting tool. In general the gears to be thus finished have been previously roughed out to an approximation of prescribed dimensions and form, and the effect produced by their passage across the cutting tool in the manner herein referred to is to bring the teeth of the gears to final dimensions and the curvature of their side faces to the final form and outlines. Usually also the tool employed is a grinding wheel, and in the present illustration of the invention two such grinding wheels are shown having plane active faces perpendicular to their respective axes and arranged with such faces in locations corresponding to oppositely disposed faces of two rack teeth conjugate to the gears being finished. However, other kinds of tools may be employed for the purpose in machines embodying this invention, such as milling cutters having profiles similar to those of the grinding wheels but provided with cutting teeth in the faces which correspond to the active faces of the grinding wheels, shaving tools of similar form having grooves in their active faces, the intersections of which with such faces provide cutting edges, lapping and burnishing tools, and in general any tools of suitable form capable of performing a modifying effect on the faces of gear teeth which are subjected to their action. However, for convenience in the following description I will generally refer to the tools as grinding wheels, but with the understanding that this term is not limiting as to the scope of the invention and that other tools of the characters last indicated are equivalent to grinding wheels and may be used interchangeably therewith.

In the planetary method of gear finishing, the work gear is associated coaxially with a master gear which rolls in mesh with a stationary master gear suitably arranged to cause the work gear, when passing across the rim of the cutting tool, to pass in rolling mesh therewith, in the same manner as though the tool rim were the tooth of a stationary rack or gear. This is a very rapid procedure, because the gears can be thus rolled past the tool at a high rate of speed; and when a number of gears are arranged at different sides of the axis of planetary revolution, all such gears are finished in the same length of time required for finishing a single gear. The numbers of teeth of the master gears and control gear are prime to one another, as pointed out in my Patent No. 2,038,665, dated April 28, 1936, in order to bring different teeth of the work gears into engagement with the tool upon successive revolutions, without pauses for indexing.

The present invention combines with the planetary principle of the above named patent, and the further generating principles and means shown in Letters Patent No. 2,356,869, granted August 29, 1944, on my application Serial No. 430,220, filed February 10, 1942, provisions for indexing the work gears with respect to their master gears in the course of their planetary travel. The indexing means employed comprises a plate or disk having a number of notches and teeth equal to the number of teeth of the gears to be finished which, however, may be of substantially larger diameter than the master gears, or may be made with greater accuracy as to the spacing of the teeth and notches than the master gears and control gear, or may be both larger in diameter and made with greater accuracy of tooth spacing. If the index plates are made with no greater accuracy of tooth spacing, but with larger diameters than the master gears, whatever errors there may be in the index plates are diminished in the work gears in the same ratio as the ratio between the diameter of the master gears and the diameter of the index plates, since the master gears and work gears have the same diameter.

It will be appreciated from the foregoing statement that the principal object of the invention is to accomplish the planetary finishing of gears with increased accuracy. A further object is to effect indexing of the work gears by one tooth space in each revolution, with a rapidity such that little or no reduction of planetary speed is needed to occasion indexing while the work gear is in some part of the orbit clear of the cutting tool.

In the following specification I will describe the embodiment of the present invention in a planetary gear grinding machine of the character shown in my before named pending application.

In the drawings herewith,

Fig. 3 is a sectional view of the work carriage and rolling head taken on line 3—3 of Figs. 1 and 2;

Fig. 4 is a view of part of Fig. 2 showing the action of indexing one of the work spindles;

Fig. 5 is a fragmentary sectional view similar to Fig. 3, showing a modified form of work spindle and work indexing means;

Fig. 6 is a cross section on line 6—6 of Fig. 5;

Fig. 7 is a view similar to Fig. 5 showing a further modification of indexing means;

Fig. 8 is a detail cross section on line 8—8 of Fig. 7;

Fig. 9 is a perspective view of a brake shoe employed in the indexing means of Figs. 7 and 8.

Like reference characters designate the same parts wherever they occur in all the figures.

Figure 1:
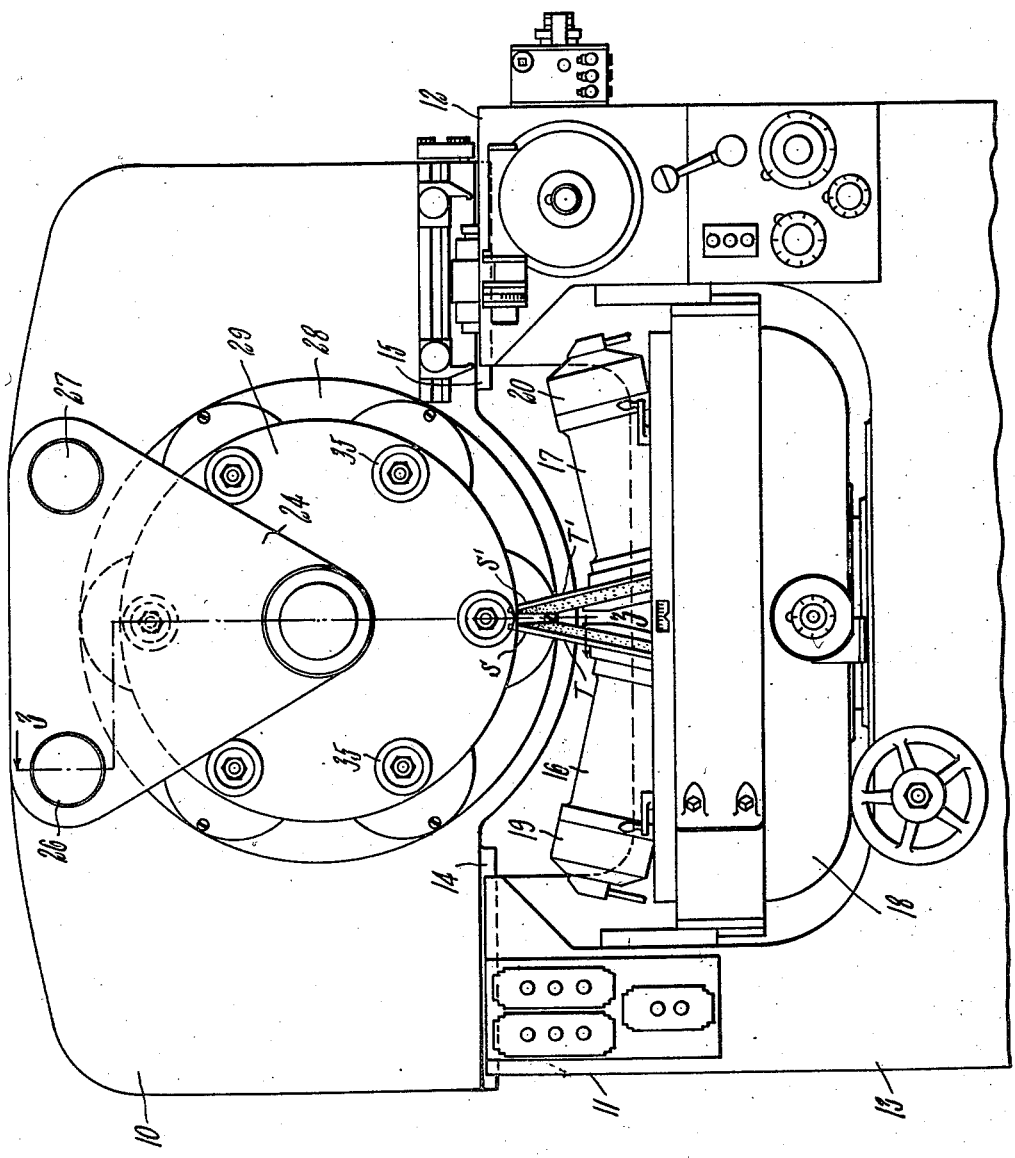
Fig. 1 is a front elevation of a gear grinding machine having two plane faced grinding wheels arranged as relatively opposite faces of two teeth of a rack.

A carriage 10 is supported on two spaced apart uprights 11 and 12 rising from a base 13, and is movable reciprocatively in a path parallel to the plane on which Fig. 1 of the drawings is taken. It is provided with ribs 14 and 15 which occupy guideways in the top faces of the uprights 11 and 12, respectively. Grinding wheels T and T' are located in the space beneath the carriage between said uprights and secured to spindles which are rotatably mounted in bearings 16 and 17 supported by a stool 18. Hydraulic motors 19 and 20 are coupled to the grinding wheel spindles and impart rotation at suitable grinding speed to the wheels T and T'. These grinding wheels have plane active faces s and s' perpendicular to their respective spindle axes, and are mounted with such active faces at inclinations to the path of the carriage 10, corresponding to the opposite faces of two teeth of a rack conjugate to the gears to be finished. The stool 18 is adjustable angularly about an upright axis symmetrically located between tools T and T' to permit adjustment of such tools for grinding either spur or helical gears. The carriage 10 is provided with bearings 21 and 22 in which is supported rotatably a massive shaft 23, the axis of which is preferably perpendicular to the directions of carriage movement established by the guides 14 and 15, and to the axis of angular adjustment of stool 18. To afford a sufficiently rigid mounting for this shaft, the bearings are held by outboard supports 24 and 25 suspended from massive bars 26 and 27, secured transversely in the upper central part of the carriage.

A head stock carrier 28 and tail stock carrier 29 surround the shaft 23 and are secured thereto. Head stocks including work spindles 30 are mounted in the carrier 28, spaced around the axis of shaft 23 at equal distances therefrom, and preferably equal distances from one another. Tail stocks 31 are mounted in the carrier 29 each in axial alinement with one of the spindles 30. The spindles and tail stocks are provided with centers 32 and 33 respectively, adapted to support arbors 34, or other shafts, carrying the work gears W. Any suitable means are provided for transmitting rotation from the spindles to the arbors. The tail stocks may have any conventional or other suitable design. In those here illustrated the center 33 is movable back and forth by a hand wheel 35 in known manner.

The shaft 23, carriers 28 and 29, and the head stocks and tail stocks constitute collectively the rotating work holder by which the work pieces are held and revolved in a planetary manner around the axis of the shaft. This holder and the parts thereof are suitably arranged to locate the orbit of the work pieces in intersecting relation, at its lower side, with the nearer edges of the grinding wheels. In the arrangement here shown, such orbit lies in a vertical plane above the grinding wheels at all points except in that part which thus intersects the rims of the wheels. Of course the depth of intersection is made such that the work gear teeth will be finished throughout so much of their depth from tip to root as needs to be finished.

Rotation is imparted to the shaft 23 by a hydraulic motor having a casing 36 and a rotor 37. The particular motor here used is of known character not original with me and needs no further description. Its casing is coupled by means of a vibration-absorbing or damping sleeve 38 with a support 39, which is secured in turn to the shaft bearing support 25; and the rotor is connected to the shaft by a resilient yieldable coupling 40. The sleeve 38 and coupling 40 may be made of rubber composition, or any other material sufficiently yielding, and at the same time resilient and strong, both to absorb vibrations and to transmit the torque of the motor to the shaft.

Each of the work spindles 30 is connected through indexing means with a master gear 41, and all of the master gears mesh with an internal control gear 42 which is mounted on the carriage coaxial with the shaft 23 and is prevented from rotating with the work holder. The function of these master and control gears is to prevent free rotation of the work gears as they revolve in their orbit and cause their teeth to come into correct engagement with the grinding wheels for performance of the grinding operation.

The indexing means above referred to consists, in the embodiment shown in Fig. 3, of a sleeve 43 rotatably mounted in the head stock carrier 28 in bearings 44 and 45, a rotor 46 fitted within the sleeve 43, secured tightly to the spindle, a head 47 fast to the sleeve 43, within which the spindle has a rotative bearing and on which the master gear 41 is keyed or otherwise tightly secured, a pawl carrier disk 48 keyed to the hub or sleeve portion of head 47, an index plate or disk 49 keyed to the spindle, and a pawl 50 carried by the disk 48 and having a toe 51 adapted to enter any of the notches of the index plate and engage the teeth flanking such notch, without backlash. The pawls of the several index mechanisms are shown in Fig. 2.

The sleeve 43 and rotor 46, with interposed radially movable balls 52 and an eccentric ball-bearing 53, constitute a hydraulic motor to which motive fluid is delivered by a supply connection 54 and from which the fluid is carried away by an exhaust connection 55. Between these connections and the motor are suitable passages and ports, the character and disposition of which are plainly shown in Fig. 3. As this motor may be of standard character and does not involve an invention novel with me, it need not be shown in any further detail.

Figure 2:
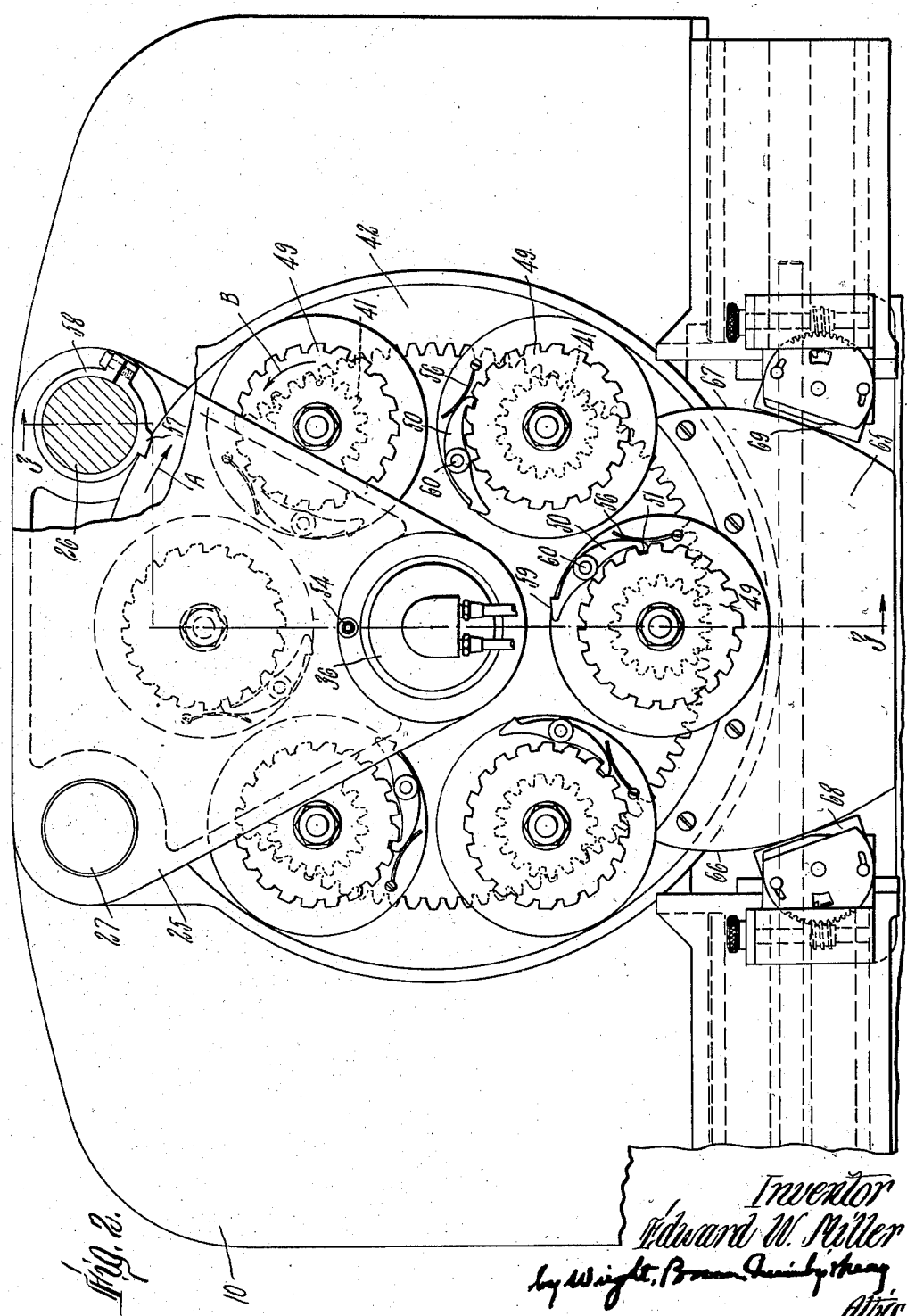
Fig. 2 is a rear elevation of the upper part of the machine on a somewhat larger scale than that of Fig. 1.

It will be obvious that while the pawl remains in locked engagement with the index disk, as shown in Fig. 2, and as it normally is, being so held by a spring 56, the rotation of the master gear as it rolls on the control internal gear 42, will be transmitted to the spindle and to the work gear. The number of teeth of the control gear is an integral multiple of the number on the master gear, whereby the same tooth of the work gear would be brought to the grinding wheels in each revolution if the spindle were not indexed. But means are provided for releasing the pawl of each spindle at a given point in the orbit of the spindle. Such means consists of a dog 57 on a strap 58 which is clamped around the bar 26 so that the dog lies in the path of a projection 59 on a tail arm of the pawl 50 which extends to the opposite side of the pawl fulcrum 60 from the toe 51. The work holder may revolve in either direction, and it is assumed for the purpose of this description that it revolves in the direction of the arrow A shown in Figs. 2 and 4. Then the pawl carrier and index plate, due to the meshing of the master gear with the internal control gear, rotate about the associated spindle axis in the relatively opposite direction, that indicated by the arrow B. The pawl fulcrum 60 is located at a considerably greater distance from the axis of the spindle than the radius of the pitch circle on which the master gear runs with the internal gear. Hence when the trip projection 59 of the pawl passes the trip dog 57, it has a linear motion opposite to the arrow A. The pawl fulcrum 60 is suitably located, and the trip projection 59 is at a suitable distance from said fulcrum to cause said projection to wipe across the surface of dog 57 while the spindle with which the pawl is associated passes the sector of the orbit in which the dog 57 lies. Either the contact surface of the dog 57 or the contact surface of the projection 59 is inclined in the manner of a cam, or both are inclined, whereby the wiping of the projection over the dog causes the pawl to be rocked and its toe 51 withdrawn from engagement with the index plate, as shown in Fig. 4. The indexing motor is then free to operate, being preferably maintained constantly under a pressure head of the operating fluid. It then rotates the spindle and index plate relative to the pawl carrier and master gear, giving an indexing movement to the spindle and work gear. Such indexing movement continues until the trip projection of the index pawl passes clear of the stationary trip dog and the pawl is brought by its spring into locking engagement with another one of the index plate teeth. By appropriate design of the trip contact faces, the time during which the pawl remains disengaged may be made shorter than the time required to turn the spindle through the angle between two adjacent teeth of the index disk. Preferably the indexing motor is organized to exert torque on the spindle in the direction opposite to the arrow B. The index plate teeth are approximately radial on one side and inclined on the other, and the bounding faces of the pawl toe 51 are arranged at corresponding angles. The direction of torque application by the motor is such that the substantially radial face of any index plate tooth is constantly pressed against the corresponding face of the pawl toe.

It is possible, instead of causing the working fluid to exert constant pressure on the indexing motor, to admit and cut off the supply of pressure fluid to the several spindle motors intermittently. But the arrangement here shown is preferred to others, not only because it maintains a pressure between the index plate and pawl, as here described, but also because of its simplicity. It will be understood that radial passages, like those shown in Fig. 3, lead from the shaft 23 to each of the spindle motors. The indexing and rotation controlling means are alike for all the spindles, and the foregoing description applies to all.

It will be noted that the index plate 49 is substantially larger in diameter than the master gear 41. This is plainly apparent in both Fig. 2 and Fig. 3. The work gear has substantially the same diameter as the master gear. Hence the index disk is substantially larger than the work gear and the linear distance through which it is turned in indexing is greater than the distance between teeth of the work gear in like ratio. Consequently whatever inevitable errors there may be in the tooth spacing of the index plate are greatly reduced in the finished gear. When the work piece teeth are changed, without indexing, by virtue of a prime ratio of the master and control gear teeth, the accuracy of tooth spacing of the work is limited by the possible accuracy of the master gear teeth. In the present invention, by virtue of the indexing means, this accuracy is increased in proportion as the index plate may be made greater in diameter than the master gear.

Figs. 5 and 6 show a modification in which the work spindle is made of two alined sections, namely, a main section 30a and a separate section 30b. The section 30b has keyed to it the master gear 41, and in integral union (or otherwise rigidly secured to it), a pawl carrier 48a. The rotor 46a of a hydraulic motor and an index plate 49a are keyed rigidly to the main part 30a of the spindle. A pawl 50a, substantially like the pawl 50 previously described, is carried by the pawl carrier 48a and pressed by a spring 56a into engagement with the index plate. The housing of the motor is secured non-rotatably in the head stock carrier 28. A trip stud 57a is mounted in the part 101 of the carriage which constitutes a housing for the head stock carrier. The trip stud 57a cooperates with the trip projection 59a of the pawl 50a in the same manner as the dog 57 previously described cooperates with respect to the pawl 50, allowing the index motor 46a to rotate the main portion of the spindle until the pawl interlocks with another notch of the index disk.

Still another method of indexing is illustrated in Figs. 7, 8 and 9, in connection with a two-part spindle like that last described. In this case, instead of a motor being employed to rotate the spindle, the main part of the spindle is retarded by one or more brake shoes 60a mounted in the sleeve 61, wherein the main part 30a of the spindle is rotatably held, so as to be movable radially toward and against the spindle. The spindle section 30b, master gear 41, pawl carrier 48a, index plate 49a and pawl 50a are substantially identical with the corresponding parts shown in Figs. 5 and 6 in construction, arrangement and function. The only difference is that, when the pawl is tripped to release the index plate, hydraulic pressure is applied through conduits 62 and 63 to press the brake shoe toward the main spindle section. The spindle is thereby retarded and the pawl, in its continued revolution after passing the trip stud, is caused to enter the next notch of the index plate. When the pawl and index plate are reengaged, the pressure is released from the brake.

As used in this description, the term "brake" is intended to include one or more brake shoes or any equivalent retarding element. As appears from Fig. 8, three such shoes are here used. They have cylindrical shanks 60b, which fit closely enough in passageways in the sleeve 61 to prevent any considerable leakage of the fluid. The passage 63 opens into an annular channel 64 surrounding that part of the sleeve 60 in which the brake shoe shanks 60b are contained. Thus pressure is applied simultaneously to all the brake shoes, however many there may be.

As in my Patent 2,356,869, the carriage 10 is reciprocated, while the work spindles are revolved planetwise. A former 65 having opposite cam faces 66 and 67, preferably of involute curvature, operates between two abutments 68 and 69, respectively, which have a relation to the former surfaces similar to that between rack tooth faces and conjugate gear tooth faces. Thus, as the carriage reciprocates, the control gear 42 is rolled on its pitch line without slip along a straight line, with the effect of giving a translative rolling component of motion to the work gears, relative to the grinding wheels, in addition to the components imparted to them by the revolving work holder and the master gears. This third component of motion makes it possible to generate tooth curves by means of tools having cutting elements lying in planes or profiles corresponding to the faces of rack teeth, as explained in said application. However, the invention is not limited to that case only, but is obviously applicable to situations such as that shown in my Patent 2,038,665, in which the profile of the cutting tool conforms to the tooth outlines of a circular gear; i. e., one in which the teeth are arranged on a curved pitch line, whether they are the teeth of an internal or external gear. That is to say, the indexing principle here disclosed is applicable to all situations of planetary movement between a work gear, or a series or plurality of gears, and a grinding wheel or equivalent tool. The indexing action is rapid and may be carried out with planet gears while revolving at nearly, if not fully, as high a speed as can be employed where the gears are not indexed.

What I claim and desire to secure by Letters Patent is:

1. A gear finishing machine comprising a rotatable holder, a spindle carried by said holder eccentric to and rotatable independently of the holder about its own axis, a master gear coaxial with the spindle, a control gear coaxial with the spindle orbit meshing with said master gear, an index plate of larger diameter than the master gear secured to the spindle, a normally connected coupling between said index plate and master gear for causing rotation of the spindle in unison with the master gear, a hydraulic indexing motor adapted to effect an angular shift between the master gear and index plate when said coupling is released, and a trip located to release said coupling in the course of the orbital revolution of the spindle, whereby the motor is enabled to effect such shift of the spindle.

2. A gear finishing machine comprising a rotatable holder, a spindle carried by said holder eccentric to and rotatable independently of the holder about its own axis, a master gear coaxial with the spindle, a control gear coaxial with the spindle orbit meshing with said master gear, an index plate of larger diameter than the master gear secured to the spindle, a normally connected coupling between said index plate and master gear for causing rotation of the spindle in unison with the master gear, a brake organized for retarding the rotation of the spindle when permitted by disconnection of said coupling, and a trip located to engage and release said coupling at a given point in the orbital revolution of the spindle.

3. In a gear finishing machine, the combination with an orbitally revoluble and axially rotatable work spindle, and planetary gearing organized to cause rotation of said spindle at a rate in harmony with its rate of revolution, of a hydraulic motor and a coupling between said spindle and planetary gearing, and means for simultaneously releasing said coupling and actuating said motor at a prescribed point in the orbit of the spindle, whereby to cause angular movement of the spindle about its axis additional to that caused by the planetary gearing.

4. In a gear finishing machine, the combination with an orbitally revoluble and axially rotatable work spindle, and planetary gearing organized to cause rotation of said spindle at a rate in harmony with its rate of revolution, of a hydraulic brake arranged for application to the spindle for retarding its rotation, a coupling normally connected between the spindle and planetary gearing, and means for temporarily disconnecting said coupling and applying said brake in the course of the revolution of the spindle, whereby the angular relation of the spindle to the planetary mechanism is altered.

5. A gear finishing machine comprising a rotatable holder, a spindle carried by said holder eccentric to, and rotatable independently of, the holder about its own axis, a machine element fixed to the spindle coaxial therewith, a control member coaxial with the spindle orbit in contact with said machine element for causing rotation thereof and of the spindle, an index plate of larger diameter than said machine element secured to the spindle, a normally connected coupling between said index plate and machine element for causing rotation of the spindle in unison with the machine element, a motor adapted to effect an angular shift between the machine element and index plate when said coupling is released, and a trip located to release said coupling in the course of the orbital revolution of the spindle, whereby the motor is enabled to effect such shift of the spindle.

6. A gear generating machine comprising a finishing tool arranged and adapted to generate prescribed tooth curves in a work gear when relative rolling movements are effected between such tool and gear, means for effecting a relative movement of revolution between said tool and a work gear, in an orbit so situated that a peripheral portion of the gear is put in operative relation with the tool in the course of each revolution, means for causing rotation of the work gear about its own axis oppositely to the orbital revolution, means for effecting simultaneously a rolling displacement between the tool and gear additional to the orbital revolution, and means for effecting a shift in the angular relationship between the work gear and the said rotation-causing means therefor when the work gear is clear of the tool.

7. A machine for generating the tooth face curves of gears comprising a work holder mounted to rotate about an axis and having means for supporting a work gear rotatably with its axis eccentric to the axis of rotation of the work holder, whereby rotation of the holder causes the work gear on said supporting means to revolve in an orbit, means for rotating said holder and means for causing the gear supporting means to rotate simultaneously at a rate and in a direction such that the work gear thereon rolls in non-slip pitch line relationship with an embracing pitch line curved about the first named axis, a circular finishing tool having a lateral zone adjacent to its circumference mounted with said zone intersecting said pitch line and with the radial element of said zone related to the pitch line as the tooth face of a rack having a straight pitch line tangent to the curved pitch line, means for rotating said tool to perform a finishing effect on the work gear teeth as the latter roll across the rim of the tool, means for effecting a rolling displacement between said orbit and the tool at a rate corresponding to non-slip rolling of the before mentioned curved and straight pitch lines with respect to one another, and means for effecting an angular shift about the axis of the work supporting means, between said work supporting means and the rotation-causing means therefor, when the work gear is clear of the tool.

8. A gear generating machine comprising a rotatable work holder including means for supporting a work gear to rotate about its own axis eccentric to the rotational axis of the work holder, a master external gear supported by the work holder in coaxial, rotation-controlling relation with the work gear, an internal gear coaxial with the work holder surrounding and meshing with said master gear, a cutting tool mounted so that its cutting portion intersects the orbit in which the periphery of the work gear travels when the holder is rotated, in position to perform a cutting action on a work gear supported by the holder in the course of the revolution of the gear, indexing means cooperating between said gear supporting means and master gear for effecting a periodic shift in the angular relation between said supporting means and master gear at a prescribed point in the revolution thereof, means for effecting relative displacement between the work holder and cutting tool in directions transverse to the axis of the work holder and to the cutting portion of the tool, and means for simultaneously rotating the internal gear around said axis.

9. A gear generating machine comprising a grinding wheel having an active face contiguous to its margin, the intersections of which with radial planes are straight lines, means for rotating said wheel about its axis, a work holder rotatable on an axis transverse to the grinding wheel axis, means on said holder for supporting a work gear in planetary arrangement with respect to said axis and in position to cross the rim of the grinding wheel in cutting relation, as to the sides of the gear teeth, with the active face of the wheel, when the holder is rotated, a master external gear in coaxial, rotation-controlling relation with said work gear, an internal gear coaxial with the work gear surrounding and meshing with said master gear, indexing mechanism coacting between said master gear and the work gear for effecting an angular shift between them about their common axis at a given point in the planetary orbit, and means for simultaneously shifting the work holder translatively in directions transverse to its axis and to the plane of the grinding wheel, and rotating the internal gear in opposite directions timed with the translative shifts of the work holder.

10. A planetary gear generating machine comprising the combination of a cutting tool, a work spindle mounted for planetary movement in an orbit so related to the cutting tool as to carry the peripheral portion of the work gear connected with said spindle in operative coaction with the tool, a machine element fixed to said spindle coaxial therewith, a control member coaxial with the orbit of the spindle in rolling engagement with said machine element for causing independent rotation of the spindle about its own axis, the spindle being rotatable independently of said machine element, a coupling between the machine element and spindle normally causing the spindle to rotate in unison with the machine element but being disconnectible therefrom, a trip arranged to cause disconnection of said coupling when the spindle is at a point in its orbit clear of the tool, and means for effecting an angular shift between the spindle and machine element when the coupling is so disconnected.

11. A planetary gear finishing machine comprising the combination with a supporting structure of a finishing tool having a work engaging portion operatively mounted on said supporting structure, a work spindle mounted on the supporting structure for planetary movement in an orbit, and for rotation simultaneously about its own axis, in a manner to carry a work gear in rolling mesh with the said engaging portion of the tool, a machine element angularly movable about the axis of said spindle for imparting rotation thereto during travel of the spindle in its orbit, a disconnectible, but normally connected, coupling between said spindle and machine element, means associated with the supporting structure and coupling for disconnecting and subsequently reconnecting said coupling while the spindle traverses a part of the orbit wherein the work piece is clear of the finishing tool, and means for effecting a relative angular displacement between the spindle and machine element during the time when the coupling is so disconnected.

12. In a gear finishing machine, the combination with an orbitally revoluble and axially rotatable spindle and planetary gearing organized to cause rotation of said spindle at a rate in harmony with its rate of revolution, of normally inoperative indexing means cooperating between said spindle and gearing for effecting a relative angular displacement between the spindle and gearing, and means for causing said indexing means to become operative when the spindle is at a prescribed location in its orbit of revolution.

13. In a machine of the character described, an axially rotatable spindle supported to revolve in an orbit of which the axis is at one side of the spindle axis, gearing associated with said spindle for causing it to rotate at a rate proportional to its rate of orbital revolution, a normally inoperative indexing motor cooperating between said spindle and gearing for effecting a shift in the angular relation between the spindle and gearing, and means for enabling said motor to become operative in the course of the orbital revolution of the spindle.

14. In a machine of the character described, an axially rotatable spindle supported to revolve in an orbit of which the axis is at one side of the spindle axis, gearing associated with said spindle for causing it to rotate at a rate proportional to its rate of orbital revolution, including an index plate connected with the spindle and a normally connected, but disconnectible, coupling between the gearing and index plate, means for causing disconnection and subsequent reconnection of said coupling with the index plate during the orbital revolution of the spindle, and means for effecting a relative angular displacement between the spindle and gearing while the coupling is so disconnected.

15. In a machine of the character described, an axially rotatable spindle supported to revolve in an orbit of which the axis is at one side of the spindle axis, gearing for causing the spindle to rotate at a prescribed rate in proportion to its rate of orbital revolution, including a gear coaxial with the spindle and a normally connected, but disconnectible, rotation-transmitting coupling between the gear and spindle, means for disconnecting and subsequently reconnecting the coupling in the course of travel of the spindle in said orbit, and a motor in driving connection with the spindle organized to impart an increment of angular movement to the spindle relatively to said gear while the coupling is so disconnected.

16. In a machine of the character described, an axially rotatable spindle supported to revolve in an orbit of which the axis is at one side of the spindle axis, gearing for causing the spindle to rotate at a prescribed rate in proportion to its rate of orbital revolution, including a gear coaxial with the spindle and a normally connected, but disconnectible, rotation-transmitting coupling between the gear and spindle, means for disconnecting and subsequently reconnecting the coupling in the course of travel of the spindle in said orbit, and a brake arranged and operable to retard the rotation of the spindle relatively to the gear when the coupling is so disconnected.

17. A machine for generating the face curves of gear teeth and analogous elements, comprising a cutting tool of disk form having a cutting face adjacent to its rim, means for driving said tool operatively, a work holder supported to rotate and to revolve about an axis at one side of its axis of rotation and in a path such as to carry a work piece into rolling engagement with and past the cutting face of the tool, means for imparting a step of incremental angular movement to the work holder about its axis equal at least to the angular spacing between adjacent teeth of a given work gear in the course of the orbital revolution of the spindle, and means for imparting a lateral translative displacement to the work holder back and forth in the course of its orbital revolution.

EDWARD W. MILLER.